Inventors:
William N. Carson, Jr.
William H. Fischer,
by Paul A. Frank
Their Attorney.

United States Patent Office 3,285,782
Patented Nov. 15, 1966

3,285,782
WATER ACTIVATED PRIMARY BATTERY HAVING A MERCURY-MAGNESIUM ALLOY ANODE
William N. Carson, Jr., Schenectady, N.Y., and William H. Fischer, Boulder, Colo., assignors to General Electric Company, a corporation of New York
Filed July 23, 1963, Ser. No. 296,996
2 Claims. (Cl. 136—100)

This invention pertains generally to electrical batteries, and more particularly, to improved multi-cell primary batteries in which a liquid electrolyte is employed. Specifically, the invention pertains to an improved multi-cell water-activated primary battery employing a galvanic couple between a magnesium alloy anode and a cathode fabricated from silver chloride or cuprous chloride.

Water-activated batteries employing a silver chloride or cuprous chloride cathode with an anode of elemental magnesium are commercially available. The battery may be stored in the dry state and thereafter activated by immersion in the liquid electrolyte or passing electrolyte through a perforated housing member. While the electrochemical action may be initiated with distilled or tap water, better performance is obtained with an ionic electrolyte. The cell may be generally characterized as capable of delivering large amounts of electrical power over short periods of time after activation, a high energy-to-weight or size ratio in the inactive state, and a short life once activation has been initiated. A common application for the device is marine use to supply the power for torpedo propulsion systems, electric lamps, buoys, and the like. The battery may be activated during such use simply by immersion in sea water.

The principal technical problems in a water-activated battery are passivation and polarization of the elemental magnesium anode. Pure magnesium and magnesium alloys containing elements to improve the physical working characteristics of the metal react readily with water vapor and oxygen at ordinary environments to form adherent oxide films rendering the anode passive to subsequent electrochemical reaction. Another serious problem is acute polarization of the anode during use at the high drain rates ordinarily encountered. Polarization is attributed to formation of porous oxide and/or hydroxide films on the anode causing even further undesirable results. More particularly, the permeable films produce localized self-discharge between adjacent anodic and cathodic areas on the same surface for substantial polarization even at open circuit. Localized discharge also generates excess hydrogen sporadically on the electrode surface during operation interferring with electrolyte passage in the relatively narrow free spaces separating adjacent electrodes in a multi-cell construction. Pure magnesium and its conventional alloys also undergo severe "pitting" during the cell operation thereby occasioning premature failure through mechanical collapse of the electrode. It would be desirable to reduce all these difficulties in the battery by direct and simple means.

It is one important object of the invention, therefore, to provide an improved magnesium anode for a water-activated battery.

It is another object of the invention to provide a water-activated battery of multi-cell configuration with an improved electrode structure.

Still another object of the invention is to provide an improved water-activated battery with electrodes comprising a composite integral structure of anode and cathode elements.

These and other objects of the invention will be apparent from the following description taken in connection with the accompanying drawings in which.

Briefly, the improved water-activated battery of the invention comprises liquid container means housing a plurality of serially connected laminated electrode sheets, each sheet having a first outer layer of a mercury-magnesium alloy in contact with one major surface of an electrically conducting inner layer and a second outer layer of a chloride compound in contact with the opposing major surface of the inner layer, the chloride compound being selected from the class consisting of silver chloride and cuprous chloride. Dielectric spacer means are provided to separate the individual electrode sheets which are arranged so that the magnesium alloy layer of one sheet faces the chloride compound layer of the next adjoining sheet. Composite electrodes fabricated with the mercury-magnesium alloy exhibit lower electrical resistance than corresponding structure employing conventional magnesium materials. The lower resistance raises cell output voltage under general operating conditions of the battery. The continuous inner layer of the present electrode provides a barrier to electrochemical reaction between the outer layers to maintain the independence of the anode and cathode functions. The inner layer further provides a common support for the reactive layers thereby simplifying construction and assembly of the battery.

A preferred electrode construction may be fabricated simply by physically pressing together the individual layers of magnesium alloy, conducting foil, and a cohered mass of the chloride compound. Permanent joining of the layers may be achieved by bonding at the lateral edges with an ordinary adhesive. Alternately, the individual layers may be joined together by interfacial bonding with an electrically conducting cement or other like fastening means to insure uniform low electrical resistance across the entire member. Final assembly of the battery is facilitated if separator elements are bonded to the chloride layer during fabrication of the individual electrodes. Integration of separator means in the composite electrode may be achieved simply by pressing small dielectric elements directly into the chloride layer.

In a different electrode configuration, the outer layer of chloride compound is perforated in order to provide a still lower resistance path across the member. A further structural modification for this same purpose is surface reduction of the chloride layer to a metal state during fabrication of the electrode.

Figure 1:
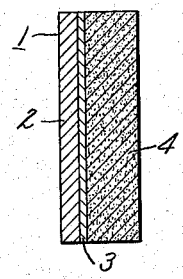
FIGURE 1 is a cross-sectional view of an electrode construction of the invention.

In FIGURE 1 there is shown in cross section a composite electrode of the invention which may be in the form of a flat sheet. The electrode 1 comprises a first outer layer 2 of commercially available mercury-magnesium alloy of approximately 0.010 inch thickness, inner foil layer 3 of a metal exhibiting a high electrical conductivity such as silver or copper at a thickness of approximately 0.002 inch, and a second outer layer 4 of silver chloride having a thickness of approximately 0.015 inch. Although the thicknesses of the layers in an electrode are not deemed critical for improved electrochemical behavior, the ratio of dimensions given does provide certain performance advantages. More particularly, it is desirable to employ an excess of magnesium over that theoretically required for complete reduction of the available silver chloride to impart additional structural integrity in the cell during operation. An excess of the magnesium alloy minimizes physical collapse of the electrode before all available silver chloride is used up electrochemically. Excess alloy also compensates for the propensity of all active magnesium compositions to "slough" off the electrode during the electrochemical reaction thereby terminating cell operation prematurely. A thickness for the chloride layer up to the value given preserves generally low internal resistance across the entire electrode, since electronic conductivity in a chloride compound is less than in metal components of the member. On the other hand, the thickness of the chloride layer should not be much below the specified dimension if it is desired to suspend separator elements directly in the layer.

Satisfactory alloy compositions for the anode layer contain approximately 0.5 to 5.0 parts by weight mercury per 99.5 to 95 parts by weight magnesium in the alloy. At mercury concentrations less than around 0.5 parts by weight in 100 parts by weight of the magnesium alloy there is little noticeable elevation in the output voltage of the electrode. At concentrations much above 5 parts mercury by weight in 100 parts by weight of a binary alloy the sloughing characteristics are less desirable than for pure magnesium.

To illustrate the electrochemical behavior of the present anode compositions compared with conventional magnesium alloys now employed in a water-activated battery, open circuit potentials were obtained along with polarization data. The operating characteristics of a commercial magnesium alloy having a weight percent composition of 6.5 percent aluminum, 0.002 percent iron, 0.45 percent manganese, 1.0 percent zinc, and the remainder magnesium developed an open circuit potential of about 1.53 volts which polarized to about 0.1 volt at a measured current density of 5 amperes per square inch. With a binary alloy having 0.5 weight percent mercury and 99.5 weight percent magnesium, the open circuit potential measured 1.9 volts which polarized to about 0.2 volt at the 5 ampere per square inch current density. A different binary alloy containing approximately 3 weight percent mercury and 97 weight percent magnesium exhibited an open circuit potential of 2.15 volts with polarization to approximately 0.4 volt at 5 ampere per square inch current density.

Figure 2:
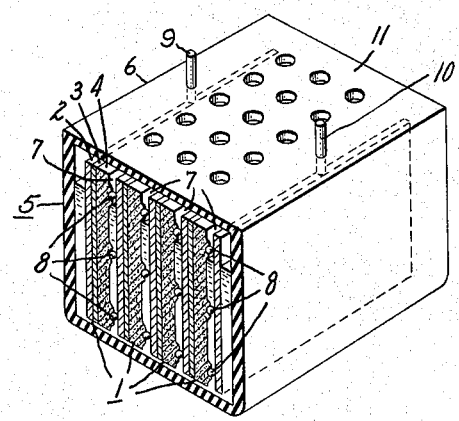
FIGURE 2 is a perspective view, partially in cross section, illustrating a preferred multi-cell battery of the invention.

In FIGURE 2 there is depicted in perspective view, partially in cross section, a multi-cell water-activated battery of the invention. Battery 5 is made up generally of a perforated case 6 containing a plurality of the composite electrodes 1 defining the individual cells of the construction. The individual cells are each defined by a magnesium layer of one composite electrode, a chloride layer from the next adjoining composite electrode which faces the magnesium layer, and the intervening free space for electrolyte established by the separator elements. Each composite electrode in the assembly thereby furnishes a cathode element for a unit cell along with an anode element for the next adjacent unit cell. As can be seen from the drawing, the described unit cell arrangement in the battery may be achieved by physically stacking the individual electrodes so that free spaces 7 are defined therebetween by separator elements 8. Internal electrical connection between individual cells is made solely through foil element 3 to produce a series circuit resulting in an output voltage at the battery terminals which is the aggregate of component cell voltages. External connection of the series may be made with the leads 9 and 10 projecting through perforated cover portion 11 of the battery case. Each lead may comprise 0.020 inch diameter copper wire fastened by means insuring good electrical contact to magnesium sheet at the end coils. The leads are preferably electrically insulated to reduce corrosion from contact with the electrolyte and also minimize internal current leakage.

Figure 3:
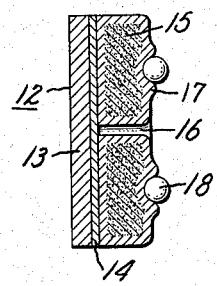
FIGURE 3 is a cross-sectional view of a different electrode construction of the invention.

In FIGURE 3 there is shown a cross section of a composite electrode having dielectric separators for integral elements in the structure. Composite electrode 12 again generally comprises first outer layer 13 of a mercury-magnesium alloy, inner conducting foil 14, and second outer layer 15 of the chloride compound. The chloride layer of the embodiment differs from the preceding configuration in perforations 16 extending through the element and a reduced surface of metal 17 originating from the cation of the chloride compound employed. The present electrode may be fabricated as before generally described after suitable preparation of the cathode layer before assembly. Reduction of the cathode surface to the metal increases electrical conductivity by an appreciable degree, thus obviating the heretofore conventional practice of inserting grids, screens, and other electronic conductors in the layer. Formation of the surface metal may be accomplished with flame treatment, chemical reducing agents such as concentrated sulfuric acid, and other known chemical reduction techniques.

Dielectric separator elements 18 in the form of glass beads or other small bodies may be pressed into the outwardly facing major surface of the chloride layer after assembly of the electrode. Alternately, the surface of the chloride layer may be deformed before assembly to facilitate holding the separator elements in place. The perforations extending through the layer may be fashioned during any forming operation employed for surface deformation. Obviously, still other modified constructions having the dielectric separator elements integrally associated with the cathode layer are also contemplated. For optimum electrochemical behavior, it has been found that spacing between adjoining electrodes should be in the order of 0.015 to 0.025 inch. Significant reduction in electrical resistance of a chloride layer is achieved if the continuous perforations are approximately $\frac{1}{32}$ inch in diameter and spaced about 1 inch apart.

From the foregoing description, it will be apparent that an improved water-activated battery has been provided. In addition, novel composite electrodes for multi-cell construction of the battery have also been shown. It is not desired to limit the invention to the preferred embodiments above described, however, since it will be obvious to those skilled in the art that certain modifications of the present teachings can be made without departing from the true spirit and scope of the invention. It is intended to limit the present invention, therefore, only to the scope of the following claims.

What we claim as new and desire to secure by Letters Patent of the United States is:

1. A water-activated battery which comprises perforated liquid container means housing a plurality of serially connected laminated electrode sheets, each sheet having a first outer layer of mercury-magnesium alloy containing approximately 0.5–5.0 parts by weight mercury per 99.5–95.0 parts by weight magnesium as the sole active anode material in contact with one major surface of an electrically conducting inner layer and a second perforated outer layer of a metal chloride compound having a reduced surface of metal in contact with the opposing major surface of the inner layer, the chloride compound being selected from the class consisting of silver chloride and cuprous chloride, and dielectric spacer means for separating the individual electrode sheets whereby the magnesium alloy layer of one sheet faces the chloride compound layer of the next adjoining sheet.

2. A water-activated battery which comprises a perforated liquid container housing a plurality of serially connected laminated electrode sheets, each sheet having a first outer layer of mercury-magnesium alloy containing approximately 0.5–5.0 parts by weight mercury per 99.5–95.0 parts by weight magnesium as the sole active anode material, the first outer layer being in contact with one major surface of an electrically conducting inner layer and a perforated second outer layer of silver chloride with a reduced surface of silver in contact with the opposing major surface of the inner layer, and dielectric spacer means integrally associated with each silver chloride layer for separating the individual electrode sheets whereby the magnesium alloy layer of one sheet faces the silver chloride layer of the next adjoining sheet.

References Cited by the Examiner
UNITED STATES PATENTS

| | | |
|---|---|---|
| 1,771,190 | 7/1930 | Polcich. |
| 2,655,551 | 10/1953 | Ellis. |
| 2,663,749 | 12/1953 | Warner et al. |
| 3,007,993 | 11/1961 | Haring _____ 136—100 |

WINSTON A. DOUGLAS, *Primary Examiner.*

B. J. OHLENDORF, *Assistant Examiner.*